US011015251B2

(12) United States Patent
Sublemontier et al.

(10) Patent No.: US 11,015,251 B2
(45) Date of Patent: May 25, 2021

(54) PROCESS FOR GENERATING A JET OF NANOPARTICLES

(71) Applicant: COMMISSARIAT A L'ENERGIE ATOMIQUE ET AUX ENERGIES ALTERNATIVES, Paris (FR)

(72) Inventors: Olivier Sublemontier, Fontenay-aux-Roses (FR); Youri Rousseau, Limours (FR); Sylvie Marguet, Palaiseau (FR); Jérôme Caron, Péronne (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 3 days.

(21) Appl. No.: 16/342,164

(22) PCT Filed: Oct. 17, 2017

(86) PCT No.: PCT/EP2017/076441
§ 371 (c)(1),
(2) Date: Apr. 15, 2019

(87) PCT Pub. No.: WO2018/073226
PCT Pub. Date: Apr. 26, 2018

(65) Prior Publication Data

US 2019/0233947 A1 Aug. 1, 2019

(30) Foreign Application Priority Data

Oct. 17, 2016 (FR) ...................................... 1660027

(51) Int. Cl.
*B05D 1/02* (2006.01)
*C23C 24/04* (2006.01)
(Continued)

(52) U.S. Cl.
CPC ............ *C23C 24/04* (2013.01); *C23C 24/082* (2013.01); *B82Y 30/00* (2013.01)

(58) Field of Classification Search
CPC ........ B82Y 30/00; C23C 24/04; C23C 24/082
See application file for complete search history.

(56) References Cited

U.S. PATENT DOCUMENTS

2011/0181958 A1 7/2011 Lin

FOREIGN PATENT DOCUMENTS

| | | | |
|---|---|---|---|
| FR | 2 961 011 | A1 | 12/2011 |
| WO | 02/05969 | A2 | 1/2002 |
| WO | 2014/190211 | A1 | 11/2014 |

OTHER PUBLICATIONS

Butburee, T. et al., "Step-Wise Controlled Growth of Metal@Ti02 Core-Shells With Plasmonic Hot Spots and Their Photocatalytic Properties," J. Mater. Chem. A, 2014, 2, 12776-12784. (Year: 2014).*

(Continued)

*Primary Examiner* — Alexander M Weddle
(74) *Attorney, Agent, or Firm* — Christensen O'connor Johnson Kindness PLLC

(57) ABSTRACT

The disclosure relates to a process for depositing nanoparticles on a substrate and comprising the following steps:
- a) generating an aerosol from a suspension of nanoparticles in a liquid;
- b) generating, with the aerosol, a jet of nanoparticles in a carrier gas, under vacuum;
- c) depositing said nanoparticles of the jet on a substrate;

characterised in that step a) is carried out using a surfactant-free suspension in which the nanoparticles comprise a core made of a conductive or semiconductor material coated by a shell made of a non-metallic material.

(Continued)

NP

The disclosure also relates to a substrate obtained by said process.

12 Claims, 2 Drawing Sheets

(51) Int. Cl.
  *C23C 24/08* (2006.01)
  *B82Y 30/00* (2011.01)

(56) References Cited

OTHER PUBLICATIONS

Butburee, T., et al., "Step-Wise Controlled Growth of Metal@$TiO_2$ Core—Shells With Plasmonic Hot Spots and Their Photocatalytic Properties," Journal of Materials Chemistry A 2(32):12776-12784, 2014.

International Search Report dated Jan. 3, 2018, issued in corresponding International Application No. PCT/EP2017/076441, filed Oct. 17, 2017, 6 pages.

* cited by examiner

PROCESS FOR GENERATING A JET OF NANOPARTICLES

BACKGROUND

The invention relates to the field of nanoparticle depositions on a substrate.

These depositions are in particular used as coating for solid parts to provide the surfaces thereof with specific properties (mechanical, optical, chemical, etc.).

The term "nanoparticles" is used to describe particles, which are generally solid, with a size of between 1 nm and several hundred nanometres. For example, the size of the nanoparticles in question can be between 1 nm and 200 nm.

There are different techniques to deposit nanoparticles on a substrate.

Generally, a jet of nanoparticles in a vacuum is used, as this is an efficient means for producing structured depositions at the nanometric scale (nanostructured).

In this context, a suitable method for producing these depositions is the aerosolization of a liquid suspension containing the nanoparticles, followed by the formation of a jet of nanoparticles in a carrier gas using a system comprising an expansion chamber and, often, an aerodynamic lens.

In this method, it is essential that the nanoparticles in suspension in the liquid do not agglomerate and remain dispersed in the liquid.

Indeed, if the nanoparticles agglomerate, the suspension becomes unstable and precipitates rapidly, and it can no longer be used for a deposition of nanoparticles. Likewise, even in the case of a partial agglomeration of the nanoparticles without precipitation of the solution, the nanoparticles, having a size that was previously controlled during the synthesis thereof, form agglomerates with a size that is no longer controlled.

Yet, the dimensions of a nanoparticle or of an agglomerate of nanoparticles directly impact the physical properties, and for example the optical properties, of the deposition on a substrate. There are numerous applications wherein a nanostructured material is advantageous in terms of controlling optical performance. This is the case for photovoltaic technologies, electroluminescent diodes, photocatalysis, biosensors, and biomedical technologies, and also for the production of aesthetically-appealing coatings.

Also, to ensure the dispersion of nanoparticles is maintained in the form of a stable suspension of non-agglomerated nanoparticles, the nanoparticles are introduced in a liquid comprising a solvent (conventional polar solvent such as water) and a surfactant, the purpose of which is to prevent the agglomeration of the nanoparticles in the solvent. For example, in the case of gold nanoparticles, CTAB (hexadecyltrimethylammonium bromide) or citrate is commonly used as surfactant. The nanoparticles are coated with these organic agents that make it possible for a homogeneous dispersion in a liquid medium without agglomeration of the particles. The nanoparticles thus coated by the surfactant to obtain a stable suspension in a conventional polar solvent are called "colloidal nanoparticles".

However, the organic molecules of the surfactant required for the stability of the suspension are present in large quantities in the liquid suspension.

During aerosolization, these molecules are vaporised.

When citrate is used as surfactant, some of these surfactant molecules remain attached to the surface of the nanoparticles and the colloidal nanoparticles are thus preserved. However, other surfactant molecules form new molecule aggregates by nucleation. Therefore, some nanoparticles are without surfactant and can agglomerate following the shocks they undergo through the action of gaseous phase diffusion. The result is a jet of nanoparticles wherein some nanoparticles are colloidal (therefore not agglomerated) and others are not, the latter being either agglomerated or not agglomerated, the jet further comprising aggregates of unwanted molecules coming from the citrate molecules.

This is not systematically a difficulty, but it often is.

When CTAB is used, the suspension remains stable, even during aerosolization. However, the jet comprises other, unwanted molecule aggregates, sometimes present in significant quantities, and that come from CTAB molecules.

By way of an example, FIG. 1 shows a deposition of nanoparticles on a substrate made from a suspension of gold nanoparticles stabilised with CTAB. This deposition, containing a reduced quantity of gold nanoparticles (white dots), sometimes aggregated and distributed in a non-homogeneous fashion, also comprises unwanted organic matter (white and grey slicks) formed during the aerosolization (spraying) of the suspension and that come from the CTAB.

As is the case with citrate, this is not systematically a difficulty, but it often is.

Indeed, it implies that the physical and mechanical, and in particular the optical properties of the deposition are not actually controlled.

Yet, for numerous applications, the requirements relating to the properties of the deposition, in particular the optical properties thereof, are increasingly important.

Thus, a purpose of the invention is to propose an improved process for the deposition of nanoparticles on a substrate.

SUMMARY

In particular, a purpose of the invention is to provide a process for the deposition of nanoparticles on a substrate wherein the deposit is, insofar as possible, formed only by the nanoparticles of interest, advantageously with little or no agglomeration.

For this purpose, the invention proposes a process for depositing nanoparticles on a substrate and comprising the following steps:

a) generating an aerosol from a suspension of nanoparticles in a liquid;

b) generating, with the aerosol, a jet of nanoparticles in a carrier gas, under vacuum;

c) depositing said nanoparticles of the jet on a substrate;

characterised in that step a) is implemented with a suspension that does not have a surfactant, wherein the nanoparticles comprise a core made of a conductive or semiconductor material coated by a shell made of a non-metallic material.

The process according to the invention can also comprise at least one of the following characteristics, taken individually or in combination:

- the shell is made of a dielectric material, for example an oxide or a borosilicate glass;
- the shell is made of an oxide selected from among titanium dioxide ($TiO_2$), aluminium oxide ($Al_2O_3$), zinc oxide (ZnO), zirconium dioxide ($ZrO_2$) or silicon dioxide ($SiO_2$);
- the shell has a thickness of between 1 nm and 100 nm, such that it can be transparent at an electromagnetic wavelength in the range between infrared and ultraviolet;

said conductive material of the core of the nanoparticles is selected from among a metal, a metal alloy, carbon or a combination thereof:

said metal is selected from among gold (Au), silver (Ag), tin (Sn), palladium (Pd), aluminium (Al) copper (Cu) or platinum (Pt);

said semiconductor material is selected from among silicon (Si), germanium (Ge), arsenides, nitrides, phosphides, antimonides, and aluminium, indium, gallium and boron tellurides, as well as the ternary and quaternary compounds thereof;

the suspension free of surfactant wherein the nanoparticles comprise a core made of a conductive or semiconductor material coated by a shell made of silicon dioxide ($SiO_2$), said suspension being produced with the following steps:

providing a suspension in a liquid of nanoparticles stabilised with a surfactant, for example citrate or CTAB, bringing the suspension thus provided in contact with MPTMS (3-mercaptopropyl)trimethoxysilane) to obtain a suspension of nanoparticles coated with silicon dioxide ($SiO_2$) and free of surfactant.

the step whereby the suspension is brought into contact with the MPTMS is conducted according to the following sub-steps:

i) introducing, in a vial, a predefined quantity of the solution obtained in the previous step and a necessary quantity of sodium hydroxide to achieve a pH close to 10;

ii) heating and stirring the vial until it reaches a temperature of between 80° C. and 90° C.;

iii) introducing an adequate quantity of MPTMS, for example between 3 µl and 100 µl, at approximately 5%, in ethanol, into the vial while continuing the stirring;

iv) stirring at the above temperature, i.e. still between 80° C. and 90° C., for several hours; and v) washing the nanoparticles by centrifugation to remove the residual surfactant;

step c) is conducted in a vacuum corresponding to a pressure of between 0.01 Pa and 10 Pa, said process further comprises a step d) consisting of depositing a matrix on the substrate, for example a photosensitive matrix;

the liquid of the suspension is a polar solvent, for example water or $C_1$-$C_4$ alcohols and mixtures thereof.

The invention also proposes a substrate provided with nanoparticles formed from a core made of a conductive or semiconductor material coated with a shell made of a non-metallic material, whereon said nanoparticles are free of surfactant and show, advantageously, little or no agglomeration.

The substrate according to the invention can also comprise at least one of the following characteristics, taken individually or in combination:

the shell is made of a dielectric material, for example an oxide or a borosilicate glass;

the shell is made of an oxide selected from among titanium dioxide ($TiO_2$), aluminium oxide ($Al_2O_3$), zinc oxide (ZnO), zirconium dioxide ($ZrO_2$) or silicon dioxide ($SiO_2$);

the shell has a thickness of between 1 nm and 100 nm, such that it can be transparent at an electromagnetic wavelength in the range between infrared and ultraviolet;

said conductive material of the core of the nanoparticles is selected from among a metal, a metal alloy, carbon or a combination thereof:

said metal is selected from among gold (Au), silver (Ag), tin (Sn), palladium (Pd), aluminium (Al), copper (Cu) or platinum (Pt);

said semiconductor material is selected from among silicon (Si), germanium (Ge), arsenides, nitrides, phosphides, antimonides, and aluminium, indium, gallium and boron tellurides, as well as the ternary and quaternary compounds thereof;

said substrate further comprises a matrix, for example a photosensitive matrix, on which or wherein the nanoparticles are arranged.

BRIEF DESCRIPTION OF THE DRAWINGS

The invention will be best understood, and various purposes, advantages and characteristics of the invention will be made clearer upon reading the following description and with reference to the appended drawings, wherein.

Figure 1:
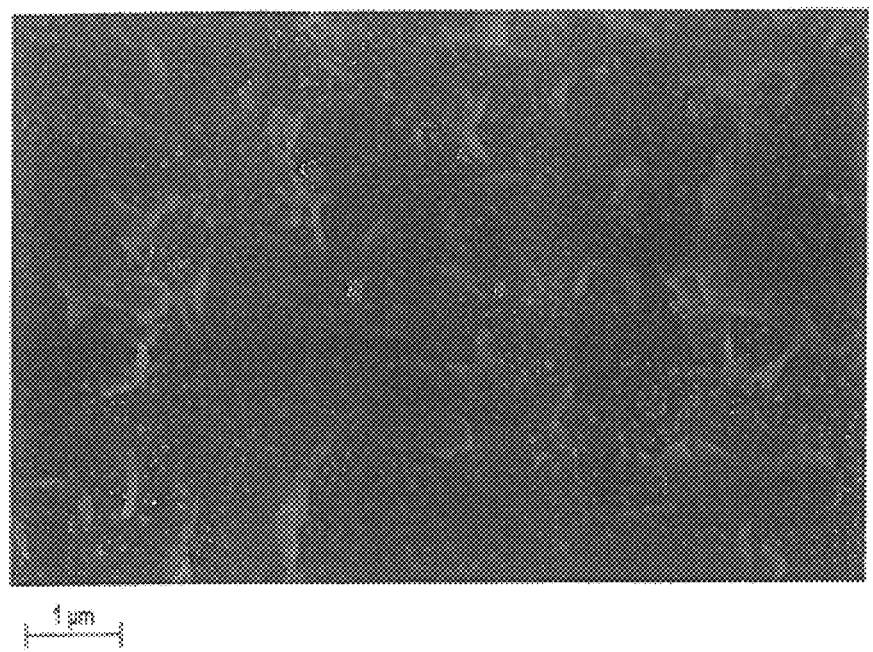
FIG. 1 shows a deposition of nanoparticles on a substrate made from a suspension of gold nanoparticles stabilised with CTAB.

The invention proposes a process for depositing nanoparticles on a substrate and comprising the following steps:

generating an aerosol from a suspension of nanoparticles in a liquid;

generating, with the aerosol, a jet of nanoparticles in a carrier gas, under vacuum;

depositing said nanoparticles of the jet on a substrate.

DETAILED DESCRIPTION

A purpose of the invention is to propose an improved process for the deposition of nanoparticles on a substrate.

In particular, a purpose of the invention is to provide a process for the deposition of nanoparticles on a substrate wherein the deposit is, insofar as possible, formed only by the nanoparticles of interest, advantageously with little or no agglomeration.

For this purpose, the invention proposes a process for depositing nanoparticles on a substrate and comprising the following steps:

a) generating an aerosol from a suspension of nanoparticles in a liquid;

b) generating, with the aerosol, a jet of nanoparticles in a carrier gas, under vacuum;

c) depositing said nanoparticles of the jet on a substrate;

characterised in that step a) is implemented with a suspension that does not have a surfactant, wherein the nanoparticles comprise a core made of a conductive or semiconductor material coated by a shell made of a non-metallic material.

The process according to the invention can also comprise at least one of the following characteristics, taken individually or in combination:

the shell is made of a dielectric material, for example an oxide or a borosilicate glass;

the shell is made of an oxide selected from among titanium dioxide (TiO$_2$), aluminium oxide (Al$_2$O$_3$), zinc oxide (ZnO), zirconium dioxide (ZrO$_2$) or silicon dioxide (SiO$_2$);

the shell has a thickness of between 1 nm and 100 nm, such that it can be transparent at an electromagnetic wavelength in the range between infrared and ultraviolet;

said conductive material of the core of the nanoparticles is selected from among a metal, a metal alloy, carbon or a combination thereof:

said metal is selected from among gold (Au), silver (Ag), tin (Sn), palladium (Pd), aluminium (Al) copper (Cu) or platinum (Pt);

said semiconductor material is selected from among silicon (Si), germanium (Ge), arsenides, nitrides, phosphides, antimonides, and aluminium, indium, gallium and boron tellurides, as well as the ternary and quaternary compounds thereof;

the suspension free of surfactant wherein the nanoparticles comprise a core made of a conductive or semiconductor material coated by a shell made of silicon dioxide (SiO$_2$), said suspension being produced with the following steps:

providing a suspension in a liquid of nanoparticles stabilised with a surfactant, for example citrate or CTAB, bringing the suspension thus provided in contact with MPTMS (3-mercaptopropyl)trimethoxysilane) to obtain a suspension of nanoparticles coated with silicon dioxide (SiO$_2$) and free of surfactant.

the step whereby the suspension is brought into contact with the MPTMS is conducted according to the following sub-steps:

i) introducing, in a vial, a predefined quantity of the solution obtained in the previous step and a necessary quantity of sodium hydroxide to achieve a pH close to 10;

ii) heating and stirring the vial until it reaches a temperature of between 80° C. and 90° C.;

iii) introducing an adequate quantity of MPTMS, for example between 3 µl and 100 µl, at approximately 5%, in ethanol, into the vial while continuing the stirring;

iv) stirring at the above temperature, i.e. still between 80° C. and 90° C., for several hours; and v) washing the nanoparticles by centrifugation to remove the residual surfactant;

step c) is conducted in a vacuum corresponding to a pressure of between 0.01 Pa and 10 Pa, said process further comprises a step d) consisting of depositing a matrix on the substrate, for example a photosensitive matrix;

the liquid of the suspension is a polar solvent, for example water or C$_1$-C$_4$ alcohols and mixtures thereof.

The invention also proposes a substrate provided with nanoparticles formed from a core made of a conductive or semiconductor material coated with a shell made of a non-metallic material, whereon said nanoparticles are free of surfactant and show, advantageously, little or no agglomeration.

The substrate according to the invention can also comprise at least one of the following characteristics, taken individually or in combination:

the shell is made of a dielectric material, for example an oxide or a borosilicate glass;

the shell is made of an oxide selected from among titanium dioxide (TiO$_2$), aluminium oxide (Al$_2$O$_3$), zinc oxide (ZnO), zirconium dioxide (ZrO$_2$) or silicon dioxide (SiO$_2$);

the shell has a thickness of between 1 nm and 100 nm, such that it can be transparent at an electromagnetic wavelength in the range between infrared and ultraviolet;

said conductive material of the core of the nanoparticles is selected from among a metal, a metal alloy, carbon or a combination thereof:

said metal is selected from among gold (Au), silver (Ag), tin (Sn), palladium (Pd), aluminium (Al), copper (Cu) or platinum (Pt);

said semiconductor material is selected from among silicon (Si), germanium (Ge), arsenides, nitrides, phosphides, antimonides, and aluminium, indium, gallium and boron tellurides, as well as the ternary and quaternary compounds thereof;

said substrate further comprises a matrix, for example a photosensitive matrix, on which or wherein the nanoparticles are arranged.

In the scope of the invention, the nanoparticles comprise a core made of a conductive or semiconductor material and the core is coated in a shell, the shell being made of a non-metallic material.

The non-metallic shell makes it possible to have a stable suspension in the liquid by preventing the nanoparticles from agglomerating in the suspension, and therefore preventing the suspension from precipitating. Therefore, the non-metallic shell serves, in the suspension, as the surfactant used in the prior art.

The consequence is that it is not useful to provide surfactant in the suspension.

Therefore, the aerosolization can be conducted in good conditions.

Moreover, during aerosolization (spraying), the formation of aggregates of molecules coming from a surfactant is also avoided. The deposition is thus not polluted by surfactant or by molecules from that surfactant.

In addition, it has been observed during aerosolization, that the suspended nanoparticles do not agglomerate or agglomerate very little, which is likely due to the presence of the non-metallic shell.

Consequently, the deposition finally achieved on the substrate is produced with nanoparticles that show no or little agglomeration, which is useful in terms of the homogeneity of the deposition, and the nanoparticles are naturally free of surfactant and molecules coming from the surfactant.

The final deposition is therefore properly controlled.

Consequently, the substrate SUB, 100 thus obtained is free of surfactant and of the molecules from the surfactant and comprises nanoparticles with a core made of a conductive or semiconductor material coated in a shell made of a non-metallic material, said nanoparticles showing advantageously no or little agglomeration.

The shell of the nanoparticles is advantageously made of a dielectric material, for example an oxide or a borosilicate glass. The term "dielectric material" describes a material that does not have free electrons capable of transporting an electrical current. Indeed, the applicant considers that a dielectric shell is particularly advantageous to prevent the formation of nanoparticle aggregates in the suspension.

In particular, the dielectric material can be silicon dioxide (SiO$_2$) or a metal oxide. From among metal oxides, titanium dioxide (TiO$_2$), zinc oxide (ZnO), zirconium dioxide (ZrO$_2$) or aluminium oxide (Al$_2$O$_3$) can be considered.

From among the conductive materials that can be used to form the core of a nanoparticle, a metal, a metal alloy, carbon or a combination thereof can be considered. In particular, it can be a metallic material such as gold (Au), silver (Ag), tin (Sn), platinum (Pt), aluminium (Al), copper (Cu) or palladium (Pd).

From among semiconductor materials, arsenides, nitrides, phosphides, antimonides, and aluminium, indium, gallium and boron tellurides, as well as the ternary and quaternary compounds thereof can be considered. From among semiconductors, metalloids such as silicon (Si) or germanium (Ge) can be considered.

In particular, nanoparticles with a core of gold (Au) and a shell of silicon dioxide ($SiO_2$) can be considered. This can prove to be particularly considered for aesthetic (luxury), biomedical, photocatalysis or photovoltaic applications.

Also in particular, nanoparticles with a core of gold (Au) and a shell of titanium dioxide ($TiO_2$) can be considered. This can be particularly considered for aesthetic (luxury), biomedical, photocatalysis or photovoltaic applications. The use of titanium dioxide ($TiO_2$) instead of silicon dioxide ($SiO_2$) provides the nanoparticle with increased hardness, which is particularly useful for aesthetic applications (luxury). Moreover, for photocatalysis applications, the properties of titanium dioxide ($TiO_2$) are more useful than those of silicon dioxide ($SiO_2$).

It is also possible to consider, always for the same applications, nanoparticles with a core made of gold (Au) and a shell made of alumina ($Al_2O_3$). Alumina has the advantage of having a particularly high hardness.

It is also possible to consider nanoparticles with a core of silver (Ag) and a shell of silica (silicon dioxide=$SiO_2$) or of titanium dioxide ($TiO_2$), in particular for antibacterial applications.

In the field of photocatalysis, platinum (Pt) can be used to form the core of the nanoparticles, with a shell of silicon dioxide ($SiO_2$) or, preferably, of titanium dioxide ($TiO_2$).

In the photovoltaic field, it is also possible to use nanoparticles with a shell of zinc oxide (ZnO) and a core selected from gold (Au), silver (Ag) or palladium (Pd).

By way of an example, a method is described below which can be considered for obtaining nanoparticles with a core made of gold (Au) and a shell made of silicon ($SiO_2$):

1) in a conventional manner, a suspension is provided in a liquid (polar solvent for example) of gold nanoparticles stabilised with a surfactant, for example citrate or CTAB;

2) the suspension thus provided is brought into contact with MPTMS (3-mercaptopropyl)trimethoxysilane) to obtain a suspension of nanoparticles coated with silica and without surfactant.

Step 1) can be conducted using any method known to a person skilled in the art.

In particular, step 1) can be carried out using the method developed by Turkevich and described by Zhao et al. (*Coord. Chem. Rev.* 2013, 257, 638-665), wherein the surfactant is a citrate. This method is particularly well-suited to obtaining spherical nanoparticles.

Also in particular, this step 1) can be carried out using the methods described by Homan et al. (htttp://www.sigmaaldrich.com/technical-documents/articles/materials-science/silica-coated-gold-nanoparticles.html) or by Moon et al. (*Mater. Lett.* 2009, 63, 2038-2040), wherein the surfactant is CTAB. In this case, it is possible to obtain nanoparticles with shapes other than spherical shapes, for example cubes, sticks or other shapes.

Step 2) can be carried out with the following sub-steps:

i) Introducing, in a vial, a predefined quantity (for example, a few ml, in particular between 1 ml and 10 ml) of the solution obtained in step 1) (stock solution) and a necessary quantity of sodium hydroxide to achieve a pH close to 10;

ii) Heating and stirring the content of the vial until it reaches a temperature of between 80° C. and 90° C.;

iii) Introducing an adequate quantity of MPTMS (for example between 3 μl and 100 μl, depending on the required thickness of the coating) at approximately 5% (in ethanol) into the vial while continuing the stirring;

iv) Stirring at the above temperature, i.e. still between 80° C. and 90° C., for several hours; and v) Washing the nanoparticles by centrifugation to remove the residual surfactant.

Step 2) makes it possible, in particular when it is implemented with the above sub-steps, to obtain a stable suspension of silica-coated nanoparticles wherein the nanoparticles are without surfactant. For the term nanoparticles "without surfactant", for example nanoparticles free of citrate or CTAB, it is important to understand that the concentration of surfactant in the suspension obtained in step 2) corresponds, at most, to 1% of the surfactant concentration in the suspension obtained in step 1) (the surfactant being present on the nanoparticles). By way of an example, for CTAB, the minimum concentration required to obtain a stable suspension for 1 hour is of approximately $10^{-5}$ mol·$l^{-1}$ (step 1)). In this example, it means that upon completion of step 2), the concentration of CTAB is at most of $10^{-7}$ mol·$l^{-1}$.

The operating mode described above makes it possible to synthesise a reduced volume of a suspension of silica-coated nanoparticles. The proportions mentioned above can be increased in a homothetic manner to achieve larger suspension volumes.

It is during step 2) that the main portion or even the totality of the surfactant (citrate or CTAB) is eliminated and replaced with MPTMS, which will make it possible for the formation of the silica coating.

The surfactant is bound to the nanoparticles with bonds that are weaker than those bonding the MPTMS to the same nanoparticles. The surfactant is therefore labile with respect to the MPTMS and can therefore be replaced with the MPTMS. Moreover, the selected temperature, i.e. between 80° C. and 90° C., is an activating element for the replacement of the surfactant by the MPTMS, which prevents gold nanoparticles from agglomerating during the replacement.

Moreover, it must be noted that MPTMS is a thiol having a methoxysilane group which, after hydrolysis of the methyl groups, cross-links and forms the silica coating. Furthermore, thiols have the advantage of targeting gold nanoparticles to form an adhesive layer at the surface of the gold. Once the MPTMS is attached to the surface of gold nanoparticles, the formation and growth of the silica layer occurs by a sol-gel process.

As has been indicated above, the quantity of MPTMS is selected on the basis of the required thickness of the silica coating, in particular between 3 μl and 100 μl. A minimum quantity is, indeed, preferable to ensure that all the surfactant (citrate or CTAB) is replaced by the MPTMS. Theoretically, there is no upper limit in terms of the thickness, and therefore in terms of the quantity of MPTMS, but a quantity of 100 μl makes it possible to achieve relatively thick depositions. In order to give some idea of quantities, it can be noted that in step iii), the introduction of 50 μl of MPTMS leads to the formation of a silica shell with a thickness of 10 nm surrounding a spherical core with a diameter of 15 nm.

However, the quantity of MPTMS is not the only parameter making it possible to control the thickness of the layer of silica coating, since the selected temperature of between 80° C. and 90° C. also makes it possible, for a given volume of MPTMS, to control the thickness of the coating. Furthermore, in addition to the nature of the coating material, the selected temperature of between 80° C. and 90° C. and other parameters of the operating mode makes it possible, in step 2), obtaining a coating that is both thin (a few nanometres) and dense.

Figure 2:
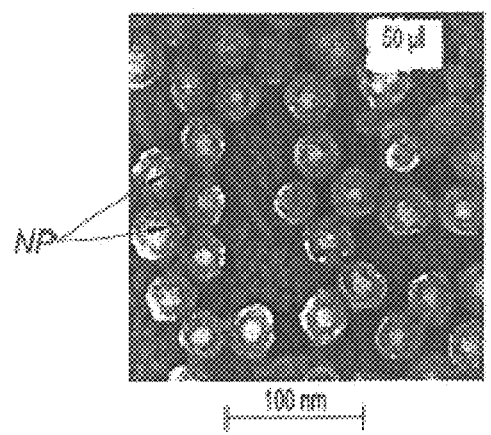
FIG. 2 shows nanoparticles used for the process for depositing nanoparticles on a substrate according to the invention.

FIG. 2 shows gold nanoparticles NP obtained following the implementation of the abovementioned operating mode, for spherical gold nanoparticles, with a diameter of 15 nm, coated in a shell with a thickness of 10 nm. This figure is a photo taken with a scanning electron microscope (SEM).

It must be noted that the above operating mode can be extended to other nanoparticles that do not have a gold (Au) core. More generally, it is applicable when a silica ($SiO_2$) coating is required on a core made of a conductive or semiconductor material, and in particular a core of metal, of a metal alloy or made of one or more semiconductors, of carbon or of a mixture thereof. In particular, for a metal core, silver (Ag), copper (Cu), platinum (Pt), palladium (Pd) or nickel (Ni) can be considered. Reference can be made, for example, to the article by Vericat et al., "Self-assembled monolayers of thiolates on metals: a review article on sulfur-metal chemistry and surface structures", Royal Society of Chemistry Adv., 2014, vol. 4, pp. 27730-27754.

Moreover, it is absolutely possible to consider another type of coating than with silicon dioxide ($SiO_2$=silica).

Thus, the article by Goebl J. et al., "*Synthesis of tailored Au@TiO$_2$ core-shell nanoparticles for photocatalytic reforming of ethanol*", Catalysis Today, 225 (2014), pp. 90-95, proposes a method to coat gold (Au) nanoparticles with titanium dioxide ($TiO_2$). Reference can also be made to the article by Peerakiatkhajohn P. et al., "*A hybrid photoelectrode with plasmonic Au@TiO2 nanoparticle for enhanced photoelectrochemical water splitting*", J. of Materials Chemistry A, 2015, vol. 3, pp. 20127-20133.

FIG. 2 is a diagram of a device for implementing the process for depositing nanoparticles according to the invention. The device 100 comprises a vial SNP comprising the suspension of nanoparticles comprising a core, for example a metal core, and a non-metallic shell in a liquid. At the end thereof, the vial is provided with an aerosol generator GA. The structure of an aerosol generator is well-known to a person skilled in the art. By way of an example, mention can be made of the "Palas AGK 2000 aerosol generator", identifiable at http://www.palas.de/en/product/agk2000. A fluid connection LF1 makes it possible to bring the aerosol towards the inlet of an aerodynamic lens LA. A gas tank R (containing a gas or a gas mixture) is also provided, typically comprising a neutral gas, connected to the inlet of the aerosol generator by a fluid connection LF2. The aerodynamic lens makes it possible to generate the jet JGP of nanoparticles NP in the carrier gas, relying on an expansion chamber CDT under a vacuum, and located at the outlet of the aerodynamic lens LA. To create a vacuum in the expansion chamber CDT, a vacuum pump P1 is provided. The deposition is then performed on a substrate SUB. It must be noted that the aerodynamic lens can be replaced by a conventional nozzle, which makes it possible to generate a supersonic jet of gas driving the nanoparticles.

Figure 4:
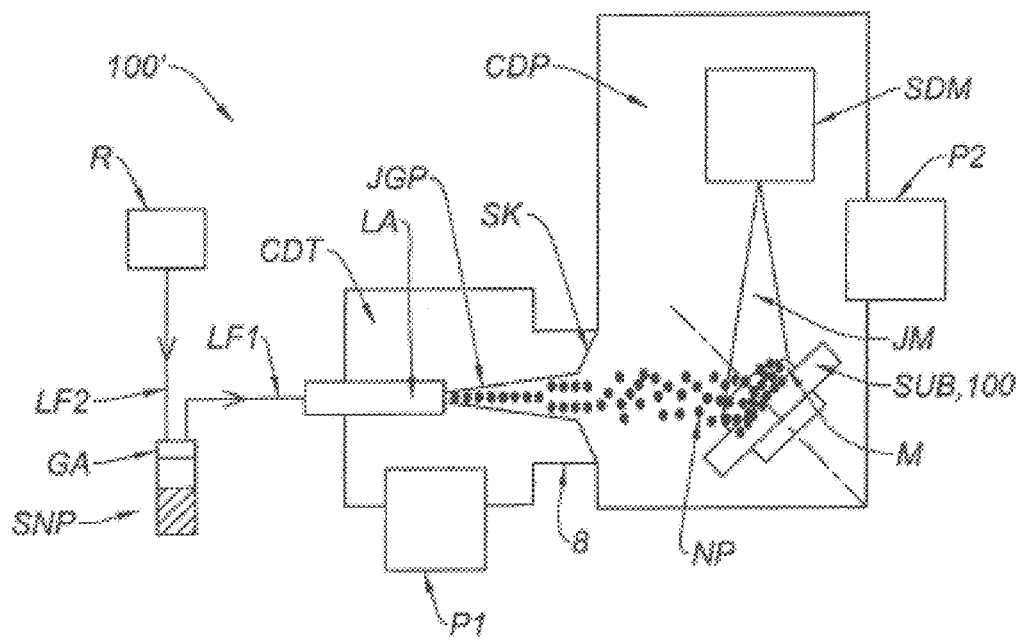
FIG. 4 is a diagram of another device likely to be used to implement a process according to the invention.

FIG. 4 is a diagram of another device for implementing the process according to the invention.

Figure 3:
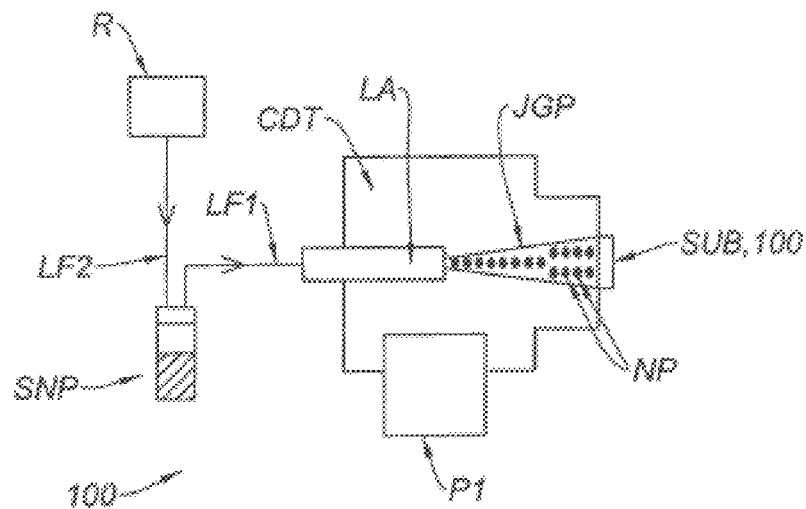
FIG. 3 is a diagram showing a device likely to be used to implement a process according to the invention.

This device 100' uses the same means as those described above for the device 100 of FIG. 3.

However, the substrate SUB on which the nanoparticles NP are deposited is located in a deposition chamber CDP. The deposition chamber CDP is fluidly connected to the outlet of the expansion chamber CDT such that the jet of nanoparticles can pass from one chamber to the other and reach the substrate SUB Advantageously, and as shown in FIG. 4, a skimmer SK is provided at the interface between the two chambers CDT, CDP. The skimmer SK allows the passage of the nanoparticles N while limiting the passage of the carrier gas.

The device 100' makes it possible for the deposition of a matrix around the nanoparticles.

For this purpose, a system SDM for the deposition of the matrix M is provided in the deposition chamber CDP, which makes it possible to generate a jet JM (flow of atoms or molecules) for the deposition of the matrix on the substrate SUB. The deposition chamber CDP comprises a pump P2 that is used to regulate the pressure in the deposition chamber.

It is thus possible to obtain a nanostructured composite material (matrix and nanoparticles) with core-shell nanoparticles comprising a non-metallic shell.

It must be noted that the deposition of the matrix M can be performed simultaneously to that of the nanoparticles NP or sequentially, based on the requirements, i.e. the structuring that is required for the deposition.

Most often, for the jet of nanoparticles to pass from the expansion chamber to the deposition chamber, the pressure in the deposition chamber is kept at a pressure that is lower than that in the expansion chamber.

However, this condition relating to the respective pressures in the expansion chamber and in the deposition chamber is not mandatory. In this context, reference can be made to document FR 2 994 443.

It must finally be noted that the process according to the invention could also be, albeit not to the same advantage, implemented with the device proposed in document FR 2 971 518.

Regardless of the device used to implement the process according to the invention, a vacuum must be maintained in the expansion chamber. The term "vacuum" is used to describe the fact that the pressure in the expansion chamber is between 0.1 Pa and 10 Pa.

Moreover, regardless of the device described above, it is possible to deposit simultaneously several types of nanoparticles using a suspension containing all of the nanoparticles to be deposited.

As an alternative, the devices presented above can be modified to produce several suspensions, each of which is associated with a spraying means and a means to generate a clean jet of nanoparticles in a carrier gas. In operation, it is possible to generate simultaneous jets. It is also possible to generate jets sequentially, depending on the needs, i.e. the structuring required for the deposition, or to vary the respective deposited quantities during the deposition so as to obtain different gradients of nanoparticle concentrations.

The absence of surfactant and the consequences thereof on the substrate and the absence of nanoparticle agglomerations makes it possible to obtain an unpolluted deposit with properly controlled properties.

This is particularly advantageous for many applications.

For certain applications, it is sought to improve the optical performance of a photosensitive matrix deposited on a substrate by relying on the advantages generated by the plasmonic effect.

This is, in particular, the case for photovoltaic applications, for photocatalysis, for light-emitting diodes (LEDs) or for the field of biosensors.

For all of these applications, the nanoparticles comprise a metallic or semiconductor core, coated in a material that is both dielectric and transparent over a range of wavelengths of interest, this range being linked to the application considered.

The fact that the coating is dielectric prevents electrical charges from being transmitted from the nanoparticle to the photosensitive matrix.

The fact that the coating is transparent in the wavelength range being considered makes it possible for the electromagnetic wavelengths to pass through the coating and reach the core of a nanoparticle such that it can generate a plasmonic effect in the photosensitive matrix. It must be noted that generally, i.e. regardless of the application being considered, the transparency of the shell can be achieved in a range from infrared to ultraviolet, with a shell thickness of between 1 nm and 100 nm. For greater thicknesses, it must be noted that the transmission rate will decrease, regardless of the material forming the shell. However, the required effect can be obtained in this range of shell thickness, of between 1 nm and 100 nm.

For these applications, the plasmonic effect is directly linked to the improvement of the optical performance of the photosensitive matrix. For the plasmonic effect to occur, the thickness of the coating must be reduced, i.e. between 1 nm and 2 nm. It must be noted that a dielectric material, such as those described above, with a thickness that is also low, is transparent in the wavelength ranges for the required applications.

More specifically, for the photovoltaic application, the wavelength of interest typically goes from infrared to ultraviolet. The nanoparticles therefore are advantageous for optical applications and the photosensitive matrix can be selected, further to the optical properties thereof, for the chemical and/or mechanical properties thereof.

In the field of light-emitting diodes, the same comments can be made as for the photovoltaic application regarding the functions performed both by the coated nanoparticles (optical) and the matrix (chemical, mechanical), the latter being more specifically a matrix made of a light-emitting material, considering the required application.

In the field of photocatalysis (e.g. decontaminating water or air, photo-electrolysis of water for the production of hydrogen), the constraints and advantages are similar. However, the wavelength range of interest generally covers the visible spectrum and the ultraviolet spectrum. The idea here is to include nanoparticles in or at the surface of a photosensitive matrix to change the photocatalytic properties thereof, the photosensitive matrix furthermore ensuring the mechanical and/or chemical properties.

In the field of biosensors, the idea is to be able to detect the presence of a chemical or biological agent by observing a change in the optical properties of the material that is nanostructured with nanoparticles. Also, any improvement of the optical sensitivity of the biosensor is beneficial.

The photosensitive matrix is obtained using a device similar to that shown in FIG. 4 (matrix M).

However, it must be noted that, in certain cases and for the abovementioned applications, such a photosensitive matrix is not mandatory.

For example, for the photocatalysis application, if the nanoparticle coating uses titanium dioxide ($TiO_2$), the presence of a photosensitive matrix obtained according to the device of FIG. 4 is not necessary in functional terms, as the photosensitive material ($TiO_2$) is already present. In this case, the simultaneous deposition of a porous matrix, of $SiO_2$ for instance, can be performed for reasons of mechanical resistance and adherence of the deposition to the substrate, but it does not play any part in the photocatalytic effect of the coating layer.

In other words, in certain cases, the photosensitive matrix is made from the coating itself in the core of the nanoparticles.

To summarise, in broader terms, the applications described above (photovoltaic applications, photocatalysis, light-emitting diodes (LEDs) or biosensors), it must be noted that the invention also relates to a use of a substrate SUB, 100 according to the invention, namely provided with nanoparticles with a core made of a conductive or semiconductor material coated in a shell made of a dielectric and transparent material, with a thickness of between 1 nm and 2 nm, the substrate on which said nanoparticles are not agglomerated and free of surfactant, said use being implemented to improve the optical properties of a photosensitive matrix.

In this use, the photosensitive matrix is generally formed by the matrix M obtained with a device of the type shown in FIG. 4, but can, in certain cases, specifically when the coating is made of titanium dioxide ($TiO_2$), be the shell itself.

For other applications, it is sought also to improve or change the optical performance of a photosensitive matrix, while avoiding the presence of plasmonic interferences between the cores of the nanoparticles.

For example, in the biomedical field, it can be useful to perform the deposition of nanoparticles coated in a material that is dielectric and transparent in the visible spectrum at the surface of a surgical instrument, to substantially increase the contrast of images provided during a procedure. In this case, and unlike the abovementioned applications, the nanoparticles must be distant from one another to limit or altogether eliminate plasmonic interferences. In this case, a relatively thick coating of a dielectric and transparent material must be provided, i.e. with a thickness that is at least equal to half of the greatest dimension of the core. The nanoparticles shown in FIG. 2 can therefore be used in this application.

For this application, a photosensitive matrix can be considered, although it is not mandatory.

In other words, the invention also relates to the use of a substrate SUB, 100 according to the invention, namely provided with nanoparticles with a core made of a conductive or semiconductor material coated in a shell made of a dielectric and transparent material, with a thickness both between 1 nm and 100 nm and at least equal to half the greatest dimension of the core, substrate wherein said nanoparticles are not agglomerated and do not have a surfactant, to improve the optical properties of said substrate.

Also, for other applications, the purpose is to control the optical behaviour of a matrix, which implies avoiding the presence of plasmonic interferences between the cores of the nanoparticles.

For example, in the field of luxury (cosmetics), it is sought to utilise, in the visible spectrum, the optical properties of nanoparticle depositions at the surface of or inside a transparent matrix. To prevent plasmonic interference between two nanoparticles coated with the transparent and dielectric material, and therefore to control the colour emitted by the nanoparticles in the transparent matrix, the thickness of the coating matrix must be relatively important, typically at least equal to half the greatest dimension of the core.

The nanoparticles shown in FIG. 2 can therefore be used in this application.

For this reason, the invention also relates to the use of a substrate SUB, 100 according to the invention, namely provided with a matrix that is transparent at least in the visible spectrum and with nanoparticles with a core made of a conductive or semiconductor material coated in a shell made of a dielectric and transparent material, with a thickness both between 1 nm and 100 nm and at least equal to half the greatest dimension of the core, matrix wherein or on which said nanoparticles are not agglomerated and do not have a surfactant, to improve the optical properties of said matrix.

The invention claimed is:

1. Process for depositing nanoparticles on a substrate and comprising the following steps:

a) generating an aerosol from a suspension of nanoparticles in a liquid;

b) generating with the aerosol a jet of nanoparticles in a carrier gas under vacuum;

c) depositing said nanoparticles of the jet on a substrate;

characterised in that step a) is implemented from a surfactant-free suspension, wherein the nanoparticles comprise a core made of a conductive or semiconductor material coated by a shell made of silicon dioxide ($SiO_2$), said suspension being produced with the following steps:

1) providing a suspension in a liquid of nanoparticles stabilised with a surfactant;

2) bringing the suspension thus provided in contact with MPTMS ((3-mercaptopropyl)trimethoxysilane) in order to replace the surfactant with MPTMS on the nanoparticles and thereby obtain a suspension of nanoparticles coated with silicon dioxide and surfactant free.

2. Process according to claim 1, wherein the shell has a thickness of between 1 nm and 100 nm, such that it can be transparent at an electromagnetic wavelength in the range between infrared and ultraviolet.

3. Process according to claim 1, wherein said conductive material of the core of the nanoparticles is selected from among a metal, a metal alloy, carbon or a combination thereof.

4. Process according to claim 3, wherein said metal is selected from among gold (Au), silver (Ag), tin (Sn), palladium (Pd), aluminium (Al), copper (Cu) or platinum (Pt).

5. Process according to claim 1, wherein said semiconductor material is selected from among silicon (Si), germanium (Ge), aluminium, indium, gallium and boron arsenides, aluminium, indium, gallium and boron nitrides, aluminium, indium, gallium and boron phosphides, aluminium, indium, gallium and boron antimonides, and aluminium, indium, gallium and boron tellurides, as well as ternary and quaternary compounds thereof.

6. Process according to claim 1, wherein step 2) comprises the following sub-steps:

i) introducing, in a vial, a predefined quantity of the suspension obtained from step 1) and a necessary quantity of sodium hydroxide to achieve a pH of about 10;

ii) heating and stirring the vial until it reaches a temperature of between 80° C. and 90° C.;

iii) introducing MPTMS at approximately 5%, in ethanol, into the vial while continuing the stirring;

iv) stirring at the above temperature, namely still between 80° C. and 90° C., for several hours; and v) washing the nanoparticles by centrifugation to remove a residual surfactant.

7. Process according to claim 1, wherein step c) is conducted in a vacuum corresponding to a pressure of between 0.01 Pa and 10 Pa.

8. Process according to claim 1, further comprising a step d) consisting of depositing a matrix on the substrate.

9. Process according to claim 8, wherein the matrix is photosensitive.

10. Process according to claim 1, wherein the liquid of the suspension is a polar solvent.

11. Process according to claim 10, wherein the polar solvent is selected from water, $C_1$-$C_4$ alcohols, and mixtures thereof.

12. Process according to claim 1, wherein the surfactant used for stabilizing the liquid of nanoparticles is either citrate or CTAB (hexadecyltrimethylammonium bromide).

* * * * *